United States Patent
Wong et al.

(10) Patent No.: US 6,948,475 B1
(45) Date of Patent: Sep. 27, 2005

(54) OPTIMIZED COMBUSTION CONTROL OF AN INTERNAL COMBUSTION ENGINE EQUIPPED WITH EXHAUST GAS RECIRCULATION

(75) Inventors: Hoi Ching Wong, San Diego, CA (US); John Payne, Vancouver, WA (US); Niels Johannes Beck, Bonita, CA (US)

(73) Assignee: Clean Air Power, Inc., San Diego, CA (US)

( * ) Notice: Subject to any disclaimer, the term of this patent is extended or adjusted under 35 U.S.C. 154(b) by 206 days.

(21) Appl. No.: 10/292,115

(22) Filed: Nov. 12, 2002

(51) Int. Cl.$^7$ .............................. F02M 51/00; F02P 5/00
(52) U.S. Cl. .................. 123/299; 123/304; 123/568.12; 123/406.19; 123/478
(58) Field of Search ....................... 123/568.21, 568.12, 123/406.19, 478, 299, 304

(56) References Cited

U.S. PATENT DOCUMENTS

| | | |
|---|---|---|
| 4,005,689 A | 2/1977 | Barnard |
| 4,142,493 A | 3/1979 | Schira et al. |
| 4,426,848 A | 1/1984 | Stachowicz |
| 4,614,175 A | 9/1986 | Asayama |
| 4,625,698 A | 12/1986 | Jamrog |
| 4,727,849 A | 3/1988 | Nishida et al. |
| 4,768,491 A | 9/1988 | Nishida |

(Continued)

FOREIGN PATENT DOCUMENTS

| | | |
|---|---|---|
| EP | 0 843 084 A | 5/1998 |
| FR | 2 832 184 A | 5/2003 |
| WO | WO 94/03717 A | 2/1994 |

OTHER PUBLICATIONS

Jose M. Desantes, Jean Arregle, Santiago Molina, and Marc Lejeune, *Influence of the EGR Rate, Oxygen Concentration and Equivalent Fuel/Air Ratio on the Combustion Behaviour and Pollutant Emissions of a Heavy–Duty Diesel Engine*, SAE Technical Paper Series, Internal Spring Fuels & Lubricants Meeting & Exposition, Paris, France (Jun. 19–22, 2000).

Christian Nellen, Konstantinos Boulouchos, Meinrad K. Eberle, *Cogeneration Gas Engines—A New Concept for Unrivaled Efficiency and $NO_x$ Emissions*, International Council on Combustion Engines, DXX–CIM 2001.

*Primary Examiner*—Erick Solis
(74) *Attorney, Agent, or Firm*—Boyle Fredrickson Newholm Stein & Gratz S.C.

(57) ABSTRACT

An EGR equipped internal combustion engine is controlled to maximize the beneficial effects and minimize the detrimental effects of EGR on engine operation. Specifically, at least one parameter indicative of the $O_2$ concentration in the intake mixture and/or at least one parameter indicative of the $H_2O$ concentration in the intake mixture is monitored, and the monitored parameter is relied on to control one or more aspects of engine operation by open loop adjustment of other control strategies and/or by a separate closed loop control strategy. These controls are applicable to virtually any engine, and are particularly beneficial to lean burn engines such as diesel (compression ignition) engines, spark ignited natural gas engines, and dual fuel or other compression ignited natural gas engines. The engine may be equipped with either actively controllable EGR or passive and uncontrolled EGR.

39 Claims, 7 Drawing Sheets

U.S. PATENT DOCUMENTS

| | | | |
|---|---|---|---|
| 4,794,903 A | 1/1989 | Suzuki | |
| 4,924,837 A | 5/1990 | Chujo et al. | |
| 4,942,860 A | 7/1990 | Chujo et al. | |
| 4,945,882 A | 8/1990 | Brown et al. | |
| 5,158,058 A | 10/1992 | Yoshida et al. | |
| 5,201,303 A | 4/1993 | Kojima | |
| 5,284,116 A | 2/1994 | Richeson, Jr. | |
| 5,333,456 A | 8/1994 | Bollinger | |
| 5,426,936 A | 6/1995 | Levendis et al. | |
| 5,433,071 A | 7/1995 | Willey et al. | |
| 5,440,880 A | 8/1995 | Ceynow et al. | |
| 5,553,575 A | 9/1996 | Beck et al. | |
| 5,611,204 A | 3/1997 | Radovanovic et al. | |
| 5,735,245 A | 4/1998 | Kubesh et al. | |
| 5,771,868 A | 6/1998 | Khair | |
| 5,802,846 A | 9/1998 | Bailey | |
| 5,806,308 A | 9/1998 | Khair et al. | |
| 5,927,075 A | 7/1999 | Khair | |
| 5,937,834 A * | 8/1999 | Oto | 123/568.18 |
| 6,003,315 A | 12/1999 | Bailey | |
| 6,003,316 A | 12/1999 | Baert | |
| 6,009,704 A | 1/2000 | Feucht | |
| 6,035,639 A | 3/2000 | Kolmanovsky et al. | |
| 6,062,026 A | 5/2000 | Woollenweber et al. | |
| 6,062,204 A | 5/2000 | Cullen | |
| 6,128,902 A | 10/2000 | Kolmanovsky et al. | |
| 6,273,076 B1 | 8/2001 | Beck et al. | |
| 6,301,887 B1 | 10/2001 | Gorel et al. | |
| 6,305,167 B1 | 10/2001 | Weisman, II et al. | |
| 6,367,256 B1 | 4/2002 | McKee | |
| 2001/0045090 A1 | 11/2001 | Gray, Jr. | |
| 2002/0040692 A1 | 4/2002 | LaPointe et al. | |
| 2002/0053343 A1 | 5/2002 | Sato et al. | |
| 2002/0139360 A1 * | 10/2002 | Sato et al. | 123/698 |
| 2003/0192516 A1 * | 10/2003 | Brunemann et al. | 123/568.12 |

\* cited by examiner

OPTIMIZED COMBUSTION CONTROL OF AN INTERNAL COMBUSTION ENGINE EQUIPPED WITH EXHAUST GAS RECIRCULATION

BACKGROUND OF THE INVENTION

1. Field of the Invention

The invention relates to internal combustion engines and, more particularly, relates to a system and method for controlling operation of an engine equipped with an exhaust gas recirculation (EGR) system.

2. Discussion of the Related Art

Countries worldwide are implementing ever-stricter emission(s) standards for diesel and other internal combustion engines. Past and some current standards for oxides of nitrogen (NOx), hydrocarbon (HC), and particulate emissions have been met through various improvements to engine design, advancements in fuel injection equipment and controls, etc. However, many of these techniques are incapable of meeting stricter emission standards that are being implemented or will soon be implemented by the United States and many other countries. Exhaust gas recirculation (EGR) is therefore becoming an increasingly important weapon in the war against emissions.

EGR systems have been used for decades to reduce NOx emissions and, as now developed, have been successfully applied to modem gasoline engines to meet past and current emission regulations. Because of the tightening NOx standards for compression ignition (diesel) engines, EGR systems are currently being investigated for application to diesel engine emission systems for reduction of NOx. However, application of EGR systems to diesel and other lean burn engines presents several distinct challenges. For instance, the direct recirculation of hot exhaust gases to the air intake system of a diesel engine increases air intake manifold temperature, increasing hydrocarbon emissions and particulate levels due to deterioration in the combustion process. In addition, soot and other particulates in the EGR system accumulate in the aftercooler and other components of the engine's intake and exhaust systems, decreasing the effectiveness of those components and shortening their useful lives. Moreover, unlike in a throttled otto cycle engine, an unthrottled diesel engine often experiences an insufficient differential pressure across the EGR line to generate an EGR flow sufficient to obtain an optimal EGR mass fraction in the air/EGR mixture inducted into the engine.

Some of the problems associated with attempting to reduce emissions in a diesel engine through EGR, and proposed solutions to them, are discussed, e.g., in U.S. Pat. No. 5,440,880 to Ceynow, U.S. Pat. No. 5,806,308 to Khair, and U.S. Pat. No. 6,301,887 to Gorel. For instance, the Gorel patent discloses a so-called low pressure EGR system for a turbocharged diesel engine. The Goret EGR system includes an exhaust particulate filter that is located downstream of and in fluid communication with the outlet of the turbocharger turbine for removing particulate matter from the exhaust gases. It also includes a low-pressure EGR line that extends from an inlet located within the main exhaust particulate filter to an outlet located upstream of the turbocharger compressor and downstream of the engine's air filter. An EGR valve, an EGR cooler, and an EGR return are located in series within the EGR line. In addition, an EGR pick-up unit is located at the inlet of the EGR line within the main particulate filter. It has an internal particulate filter to remove particulates from the EGR stream.

Solutions proposed by the Gorel patent and others solve some of the problems discussed above to the extent that it is now possible to implement a practical EGR system in a diesel engine on either an original equipment manufacturer (OEM) or an aftermarket basis. However, the controls of prior EGR equipped engines do not take full advantage of EGR when attempting to reduce emissions or otherwise optimize combustion control.

For instance, an increasingly popular technique for reducing emissions is to optimize engine operation based on excess air or "lambda." Lambda is usually defined as the ratio of total air available for combustion during a particular combustion cycle to that required for stoichiometric combustion, i.e., that required to burn all of the fuel during that cycle. If lambda drops below a minimum threshold, the reduced oxygen level in the combustion chamber increases $NO_x$ and other emissions to unacceptable levels. On the other hand, if lambda rises above a maximum acceptable threshold, misfire can occur, resulting in excessive, unwanted emissions and sharply decreased thermal efficiency. Optimum lambda varies with speed, load, and other factors. Characteristics that are controlled to optimize lambda include fuel supply quantity, charge pressure or manifold absolute pressure (MAP), and air charge temperature (ACT).

Of course, oxygen is the only reactive constituent of air. The remaining constituents, principally nitrogen, are largely inert. Lambda based controls assume that the oxygen concentration in the combustion mixture is equal to the oxygen concentration in the ambient atmosphere, i.e., 21% on a mole fraction basis, and then base their calculations on that assumption. This assumption is incorrect in EGR equipped engines. The recirculated exhaust gases contain little or no oxygen and, when mixed with ambient air, produce an intake mixture that has substantially less oxygen on a mole fraction basis than ambient air. Lambda based controls therefore overestimate the reactability of the combustion mixture, leading to inaccurate calculations and resultant inferior controls. Other standard combustion control strategies similarly fail to adequately take the oxygen concentration reducing effects of EGR into account.

EGR is also relatively heavily laden with water vapor, which is a major combustion product. The mixing of EGR with intake air therefore introduces substantial quantities of water vapor into the resultant intake mixture. This water vapor introduction has two effects, one potentially beneficial and one potentially harmful, neither of which has been adequately addressed by the prior art.

First, the inventors have discovered that the water vapor in the intake mixture can have the same effect as water injection, which is widely-used in diesel engines to reduce the flame temperature in the combustion chamber for $NO_x$ reduction purposes. No known system takes this effect into account when adjusting engine operating characteristics such as ignition timing and lambda. Nor does any known system actively control engine operation to obtain a specific desired water vapor concentration dependent parameter in the intake mixture.

Second, under some engine operating conditions, the water vapor may condense after it is mixed with ambient air. This condensation can lead to accelerated corrosion of downstream components of the air intake system. Some systems attempt to prevent condensation by removing at least some water vapor from the exhaust stream in an aftercooler located upstream of the air/EGR mixing device. However, as should be apparent from the preceding paragraph, the removal of more water vapor than is required to avoid condensation results in reduced $NO_x$ reduction effectiveness due to the unnecessarily low moisture concentration of the intake mixture.

In light of the foregoing, it should be apparent that the need has arisen to optimize the combustion control of an internal combustion engine based on the actual oxygen concentration in the intake gas stream or a parameter indicative of the oxygen concentration.

As also should be apparent from the foregoing, the need has additionally arisen to take advantage of the water content in an EGR stream to reduce $NO_x$ emissions, preferably while still preventing condensation in the engine's air intake system.

SUMMARY OF THE INVENTION

In accordance with a preferred aspect of the invention, an improved method for controlling an engine equipped with an EGR system includes measuring a parameter of a constituent of an air/EGR intake mixture; calculating, based on the measuring step, a parameter indicative of a partial pressure of the constituent in the intake mixture; and adjusting at least one engine operating characteristic based on the calculating step.

The calculating step may comprise calculating a parameter that depends on a partial pressure of oxygen in the mixture, such as excess oxygen ratio (EOR). The parameter can then be used to adjust other engine control operations on an open loop basis or as a separate, closed loop control in which the determined value of the parameter is compared to a desired value, and in which the adjusting step is performed based on the comparison. In this case, the adjusting step may comprise adjusting at least one of a fuel supply timing, a fuel supply quantity, EGR flow, ignition timing, manifold absolute pressure (MAP), and air charge temperature (ACT). The characteristic(s) adjusted will vary with, e.g., the result sought and the operating characteristics of the controlled engine.

Instead of or in addition to basing controls on oxygen measurements, the measuring step may comprise measuring at least one parameter that is dependent on the concentration of moisture in the intake mixture. In this case, the calculating step may comprise determining a value of a parameter indicative of water vapor partial pressure in the intake mixture and comparing the calculated value of the parameter to a desired value of the same parameter. The adjusting step may then be performed based on the comparison. It may comprise adjusting at least one of ignition timing, fuel supply quantity, and EGR flow.

The moisture measurements may also be used to prevent condensation in the engine's intake system. In this case, the measured parameter preferably is indicative of one of 1) the ambient relative humidity and 2) the relative humidity of the intake mixture. The engine can then be controlled, based on this measurement, to avoid condensation in the engine's air intake system. For instance, the adjusting step may comprise adjusting at least one of 1) a temperature of the intake mixture and 2) the moisture concentration of the intake mixture. The moisture concentration can most easily be adjusted by adjusting the setting of an exhaust gas recirculation valve controlling EGR flow to the intake system of the engine.

In accordance with another aspect of the invention, an EGR equipped engine is provided that implements a method having some or all of the foregoing aspects. The engine may be a lean burn engine such as a diesel engine, a spark ignited gas engine, or a compression ignited pilot-fueled gas engine. Many controls described above can be performed even if the engine is equipped with a passive EGR system lacking an actively settable exhaust gas recirculation valve.

Other aspects and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes all such modifications.

BRIEF DESCRIPTION OF THE DRAWINGS

Preferred exemplary embodiment of the invention are illustrated in the accompanying drawings in which like reference numerals represent like parts throughout, and in which.

DETAILED DESCRIPTION OF THE PREFERRED EMBODIMENTS

1. Resume

Pursuant to preferred embodiments of the invention, an EGR equipped internal combustion engine is controlled to maximize the beneficial effects and minimize the detrimental effects of EGR on engine operation. Specifically, at least one parameter indicative of the $O_2$ concentration in the intake mixture and/or at least one parameter indicative of the $H_2O$ concentration in the intake mixture is monitored, and the monitored parameter is relied on to control one or more aspects of engine operation. For instance, for $O_2$ dependent control, the $O_2$ concentration in the intake gas stream can be monitored, and an excess oxygen ratio (EOR) or another oxygen partial pressure dependent parameter can be derived from the resultant data. The derived parameter can be used for open loop adjustment of another control strategy and/or can be used as the basis for a separate, closed loop control strategy designed to optimize that or a related parameter. As another example, a relative humidity or other sensor can monitor the $H_2O$ concentration in the intake mixture, and the monitored parameter or another parameter derived from it can be used 1) to avoid condensation in the engine's air intake system, 2) as the basis for open loop adjustment of another control strategy to take the parameter into account, and/or 3) as the basis for a separate closed loop control strategy for controlling that parameter to obtain a desired effect. These controls are applicable to virtually any engine, and are particularly beneficial to lean burn engines such as diesel (compression ignition) engines, spark ignited natural gas engines, and dual fuel or other compression ignited natural gas engines. The engine may be equipped with either actively controllable EGR or passive and uncontrolled EGR.

The theory behind the control strategies discussed in the preceding paragraph and application of that theory to specific engines will now be discussed in turn.

2. Theory

Figure 1:
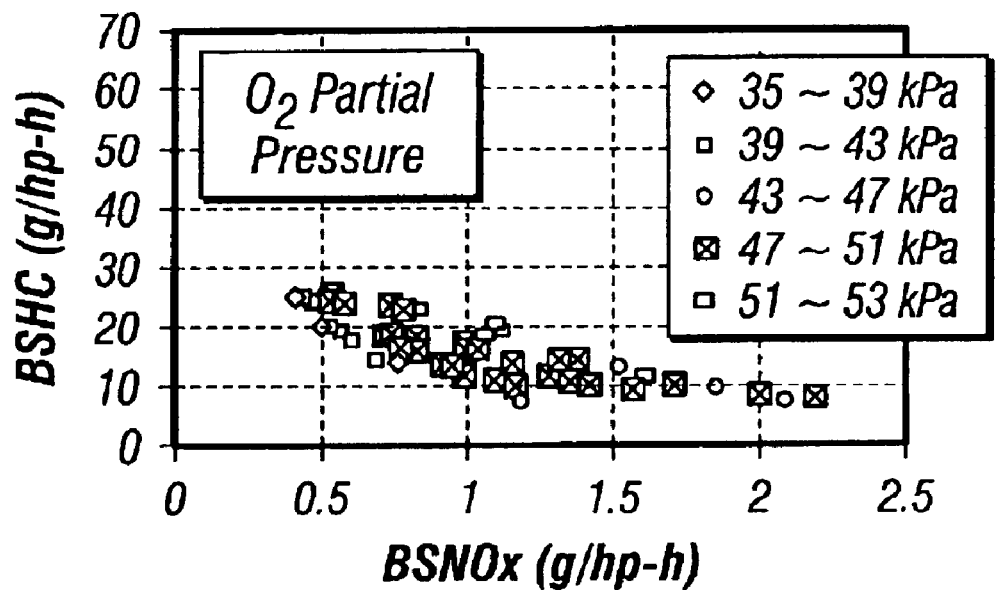
FIG. 1 is a graph illustrating the effects of $O_2$ partial pressure variations on $NO_x$ and hydrocarbon emissions in a pilot fueled compression ignited natural gas engine.
Figure 2:
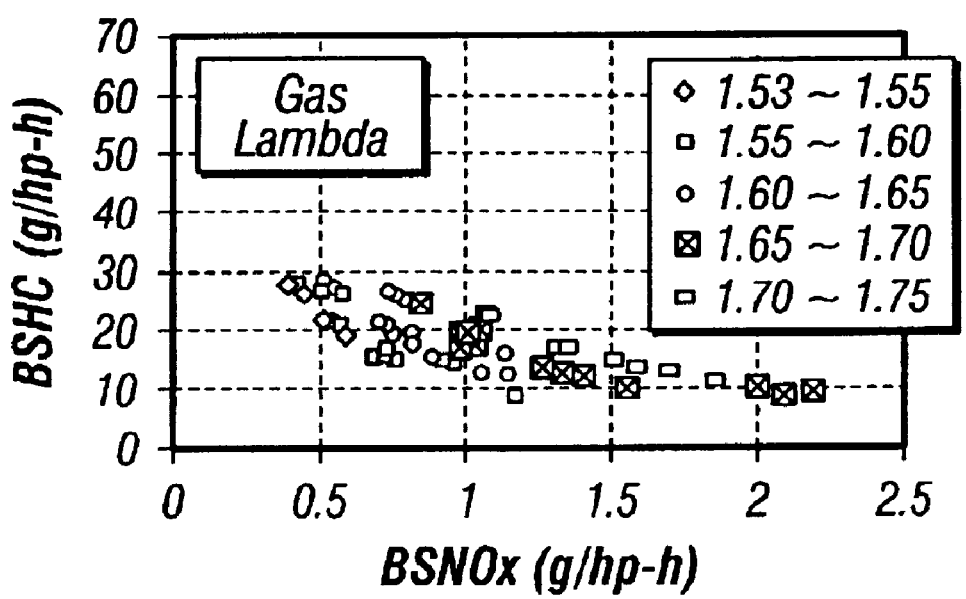
FIG. 2 is a graph illustrating the effects of lambda (corrected for EGR) variations on $NO_x$ and hydrocarbon emissions in the same engine.
Figure 3:
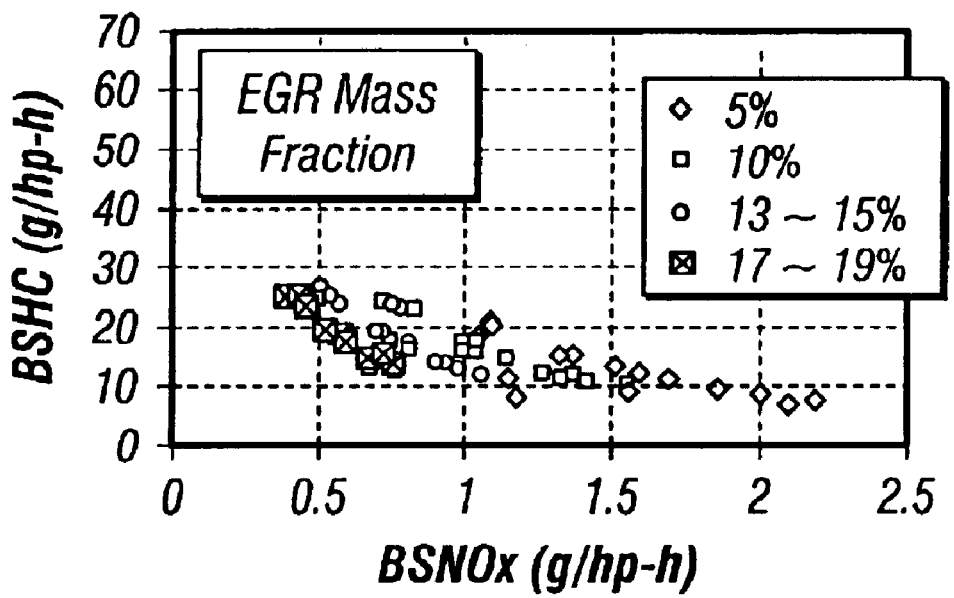
FIG. 3 is a graph illustrating the effects of EGR mass faction variations on $NO_x$ and hydrocarbon emissions in the same engine.

Combustion and emissions are dependent upon the oxygen concentration in the intake mixture. Combustion control therefore can be performed most effectively if it is based directly on oxygen measurements rather than indirectly through air measurements. This fact is confirmed graphically in FIGS. 1–3, which illustrate the effects of $O_2$ concentration changes in a Caterpillar model C12 dual fuel engine. FIG. 1 illustrates the relationship between 1) "$O_2$ partial pressure" in an intake mixture, and 2) $NO_x$ and HC emissions, where "$O_2$ partial pressure" is defined as the partial pressure of oxygen in the intake mixture to the total pressure. FIG. 1 illustrates that both $NO_x$ and HC emissions vary with $O_2$ partial pressure changes, with the optimal tradeoff at 100% load and 1880 rpm engine speed. Referring to FIG. 2, both $NO_x$ and HC emissions also vary with "gas lambda," which is defined as the ratio of effective air available for combustion of natural gas to that required for stoichiometric combustion in the combustion chamber. The effective air available takes into consideration of EGR mass fraction within the mixture of recirculated exhaust gas and fresh intake air. FIG. 2 indicates that, for a given gaseous fuel quantity, gas lambda is proportional to and varies directly with $O_2$ partial pressure. FIG. 3 illustrates that both $NO_x$ and HC emissions also vary with EGR mass fraction. The decrease in $NO_x$ emissions can be attributed partly to increase in water vapor content in the gas stream, as discussed in more detail below.

Armed with the data partially tabulated in one or more of FIGS. 1–3, it is possible to perform combustion control to optimize an $O_2$ partial pressure dependent parameter for $NO_x$ and/or HC emissions for prevailing speed and load conditions or at least take that parameter into account when optimizing another parameter, such as lambda, to obtain a desired effect, such as a desired $NO_x$ emission level, a desired HC emission level, or a desired brake specific fuel consumption (BSFC). A convenient and intuitive $O_2$ partial pressure dependent parameter, but by no means the only possible parameter, usable as a basis for this control is excess oxygen ratio (EOR). EOR is defined as the ratio of the actual oxygen in the intake mixture to the oxygen required for a stoichiometric combustion. The EOR can be determined on a cylinder-by-cylinder, cycle-by-cycle basis by 1) first determining the mass of oxygen in the combustion chamber using the detected $O_2$ partial pressure and the known supply valve opening period, or the known volumetric efficiency and cylinder displacement, then 2) determining the actual $O_2$/fuel ratio using the determined mass of oxygen and the known fuel injection quantity, and then 3) determining EOR from the determined $O_2$/fuel ratio and known or determined fuel quality information. EOR is an attractive basis for combustion control because it provides a more direct and more accurate indication of the available oxygen for combustion in the mixture than lambda.

Possible mechanisms for optimizing combustion based on EOR or another measured $O_2$ partial pressure dependent parameter in different engines are described generally below in connection with the flowchart of FIG. 5 and more specifically below with respect to the engine schematics of FIGS. 6 and 7, respectively.

Figure 4:
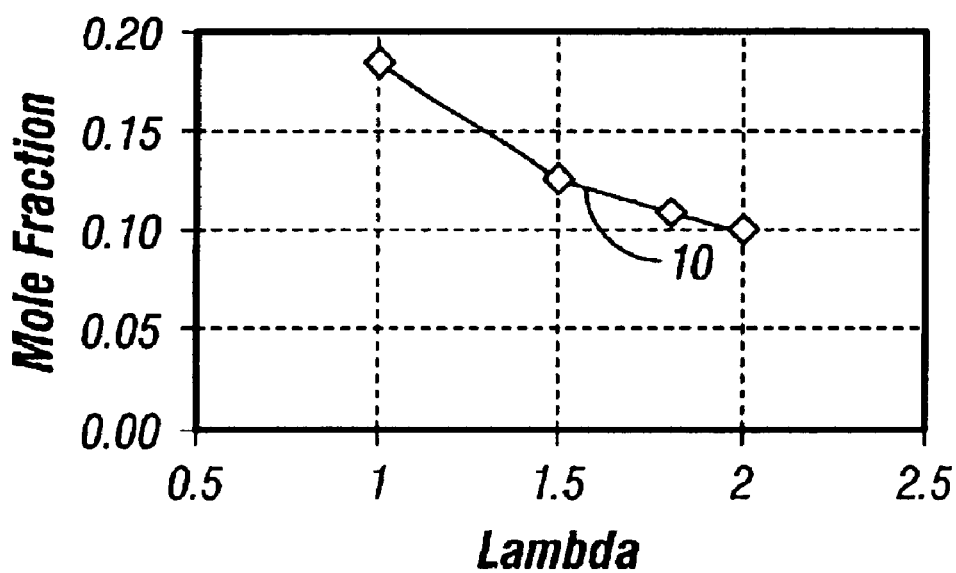
FIG. 4 is a graph illustrating the relationship between exhaust water vapor concentration and lambda in a natural gas engine.

Water vapor partial pressure also affects combustion, and combustion control therefore can be optimized based on a water vapor partial pressure dependent parameter. Referring again to FIG. 3, $NO_x$ emissions decrease with increased EGR mass fraction throughout the speed and load range of the engine. This reduction results not only from the reduced excess oxygen content of the intake mixture, but also because of the flame temperature reduction effect of the increased water vapor in that stream as a result of EGR. It has also been discovered that lambda and water vapor partial pressure in the exhaust gases are inversely related. The curve 10 of FIG. 4 reveals that, in a typical natural gas engine, lambda decreases from about 2.0 to 1.0 as the partial pressure of water vapor in the exhaust gases increases from a mole fraction of about 0.10 to about 0.19. This relationship permits an engine equipped with EGR to be run relatively rich and yet maintain relatively low $NO_x$ emission levels by retaining a relatively high water vapor partial pressure in the intake mixture, resulted from an increased EGR mass fraction. Hence, a target lambda or corresponding target EOR could be adjusted downwardly in the presence of a relatively high water vapor partial pressure. Other combustion control strategies could be adjusted to take $H_2O$ partial pressure into account in a similar manner. The engine could also be actively controlled to maintain the water vapor partial pressure or a parameter dependent directly on it at a target level required to obtain a desired effect, such as a desired NOx emission level at prevailing speed and load conditions. Mechanisms for affecting these controls are described below in conjunction with the description of FIG. 5.

High water vapor concentrations can, however, lead to condensation under some operating conditions, leading to accelerated corrosion of air intake system components. This potential problem can be avoided by monitoring the relative humidity in the mixture and taking active measures to prevent the relative humidity from exceeding 100%. These measures could include taking steps to increase air charge temperature, reduce water vapor concentration, or both. An example of these measures is described in detail below in conjunction with FIGS. 5A–5C.

3. Construction and Operation of Practical Embodiments

The techniques described above can be employed on a variety of different engines using many different control strategies. They are particularly (but not exclusively) beneficial to lean burn engines equipped with cooled, low pressure EGR. Two different types of lean burn engines to which the technique is applicable are illustrated in FIGS. 6 and 7, respectively. Both engines are controllable using specific implementations of the generic strategy illustrated in FIGS. 5A–5C, which will be discussed both in conjunction with the engine of FIG. 6 and the engine of FIG. 7.

A. Application to Diesel Engine

Figure 6:
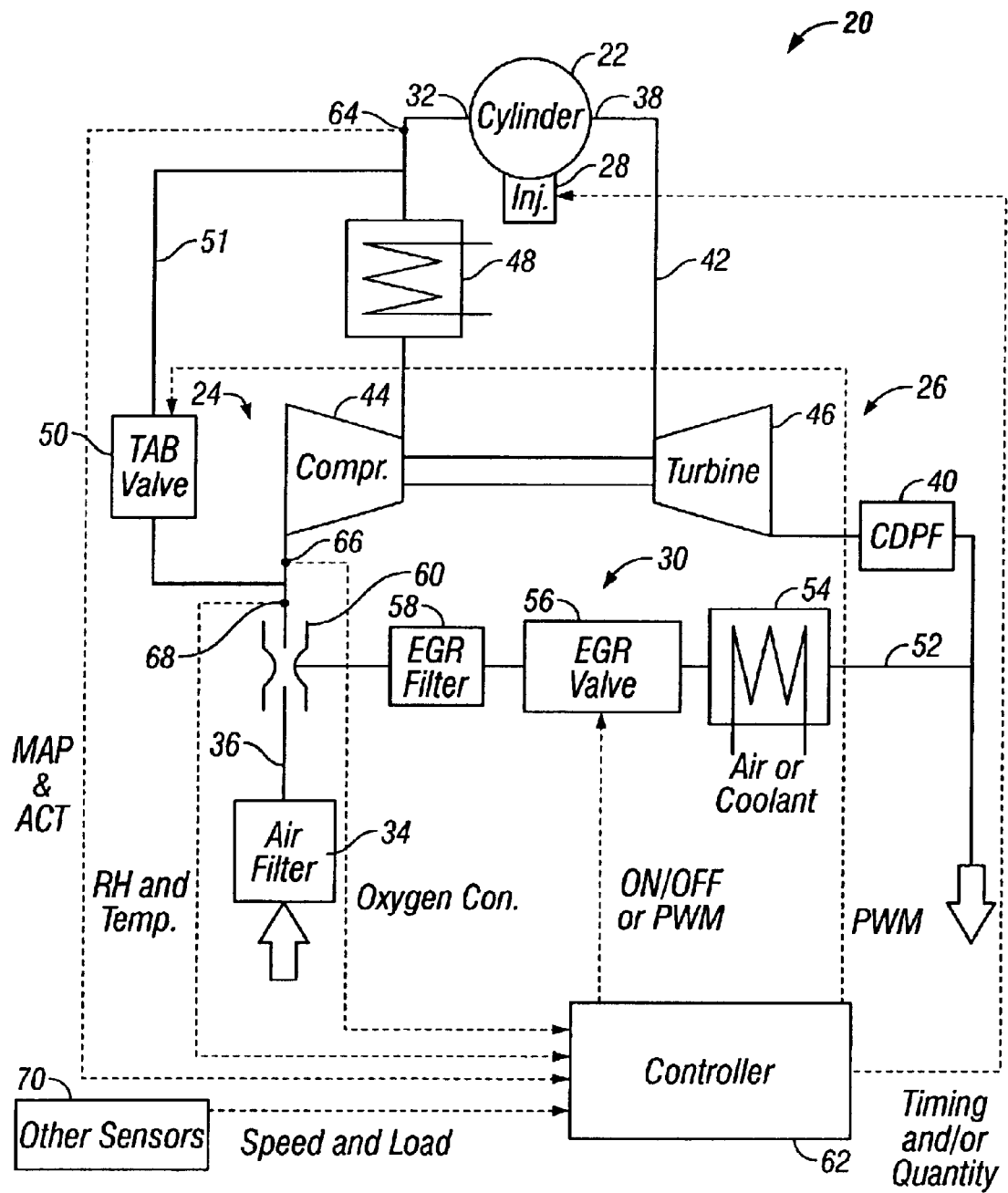
FIG. 6 schematically illustrates a diesel engine configured to be controlled by the combustion control routine illustrated in FIGS. 5A–5C.

Referring now to FIG. 6, a diesel engine 20 to which the invention is applicable includes a number of cylinders 22 (only one of which is shown), an intake system 24 supplying an air/EGR combustion mixture to the cylinders 22, an exhaust system 26, a fuel injection system 28, an EGR system 30, and other components (not shown) commonly found on a compression ignition engine such as intake and exhaust valves. The fuel injection system 28 includes a source of diesel fuel and at least one electronically controlled fuel injector per cylinder 22. The intake system 24 comprises an air intake manifold 32 having a split outlet connected to the various cylinders 22 and an inlet connected to an air filter 34 by an intake passage 36. The exhaust system 26 comprises an exhaust manifold 38 having a split inlet coupled to the various cylinders and an outlet coupled to a diesel particulate filter 40 by an exhaust passage 42. The illustrated engine 20 is a turbocharged engine having a compressor 44 located in air intake passage 36 upstream of the intake manifold 32 and a turbine 46 located in the exhaust passage 42 downstream of the exhaust manifold 38. A passive or controllable air charge cooler 48 and a controllable turbo air bypass (TAB) valve 50 are also provided in the air intake system 24 for further treating and/or controlling the flow of compressed air to the air flow intake manifold 32. The TAB valve 50 is located in a TAB line 51 bypassing the compressor 44.

In accordance with a preferred embodiment of the invention, the EGR system 30 is configured to recirculate a portion of the exhaust gases through an EGR line 52 having an inlet in fluid communication with an outlet of the turbine 46 and an outlet in fluid communication with the intake passage 36 upstream of the compressor 44. The EGR system 30 includes, from upstream to downstream end, an EGR cooler 54, an EGR valve 56, and an EGR filter 58, all located in the EGR line. The EGR valve 56 may be a completely passive valve that relies on operation of the remaining EGR system components for its setting, hence providing a totally passive and uncontrolled EGR control system. Preferably, however, it is controllable at least to the extent that it can be electronically shut off upon demand in order to halt EGR and thus prevent condensation in the intake system 24. In more sophisticated systems, it may alternatively be a variable/orifice EGR valve electronically settable to actively control EGR flow to the intake system 24 as described in more detail below.

The outlet of the EGR line 52 discharges into the EGR inlet of a venturi 60 that is disposed in the intake passage 36 upstream of the compressor inlet. The venturi 60 also has a fresh air inlet that receives ambient air from the air filter 34 and a mixture outlet that discharges the air/EGR mixture to the compressor inlet. A preferred venturi suitable for drawing EGR into the incoming air stream and mixing it with the air stream is described in co-pending and commonly assigned patent application Ser. No. 10/1 93,257, filed Jul. 11, 2002, the contents of which are hereby incorporated by reference in their entirety. The preferred particulate trap (if present), EGR cooler, and EGR filter are also described in the '257 application.

A controller 62 is also provided for controlling operation of the fuel injectors, the TAB valve 50, the EGR valve 56 (if the EGR valve is actively controlled), and possibly other components of the engine. The controller 62 receives signals indicative of $O_2$ partial pressure in the intake mixture, water vapor concentration in the intake mixture, intake mixture temperature or air charge temperature (ACT), intake mixture pressure or manifold absolute pressure (MAP), speed, load, and possibly additional data. MAP is monitored by a sensor located in or near the intake manifold. The MAP sensor may be part of a block or module 64 that also measures ACT at the same location. $O_2$ partial pressure indicative data pressure preferably is supplied by an $O_2$ concentration sensor 66 located in the intake passage 36 at the compressor inlet.

Placing the sensor 66 in this location permits the controller 62 to calculate $O_2$ partial pressure using data from the $O_2$ sensor and the MAP sensor. The water vapor dependent parameter data preferably is obtained from a sensor arrangement generally denoted 68. The sensor arrangement 68 preferably monitors relative humidity and temperature in the intake passage 36 at the compressor inlet. Alternatively, the ambient relative humidity could be measured. The $H_2O$ partial pressure and dew point can then be calculated from this data and/or data from the ACT sensor in the module 64. Speed, load, and any other data desired for combustion control is supplied via known sensors, collectively denoted 70 in FIG. 6.

The controller 62 can then control the TAB valve 50, the EGR valve 56, and/or fuel injectors based on the monitored and calculated parameters so as to optimize performance characteristics such as $NO_x$ reduction, HC reduction, and condensation prevention. The control preferably is implemented on a cylinder-by-cylinder, cycle-by-cycle basis. A routine that can be programmed into the controller 62 for this purpose is illustrated schematically in FIGS. 5A–5C, with the main routine being illustrated at 80 in FIG. 5A and $H_2O$ and $O_2$ control subroutines being illustrated at 100 and 120 in FIGS. 5B and 5C, respectively. It should be understood that the term "routine" is used herein to designate any computer implemented strategy and is not necessarily limited to the performance of operations by executing programmed codes.

Figure 5A:
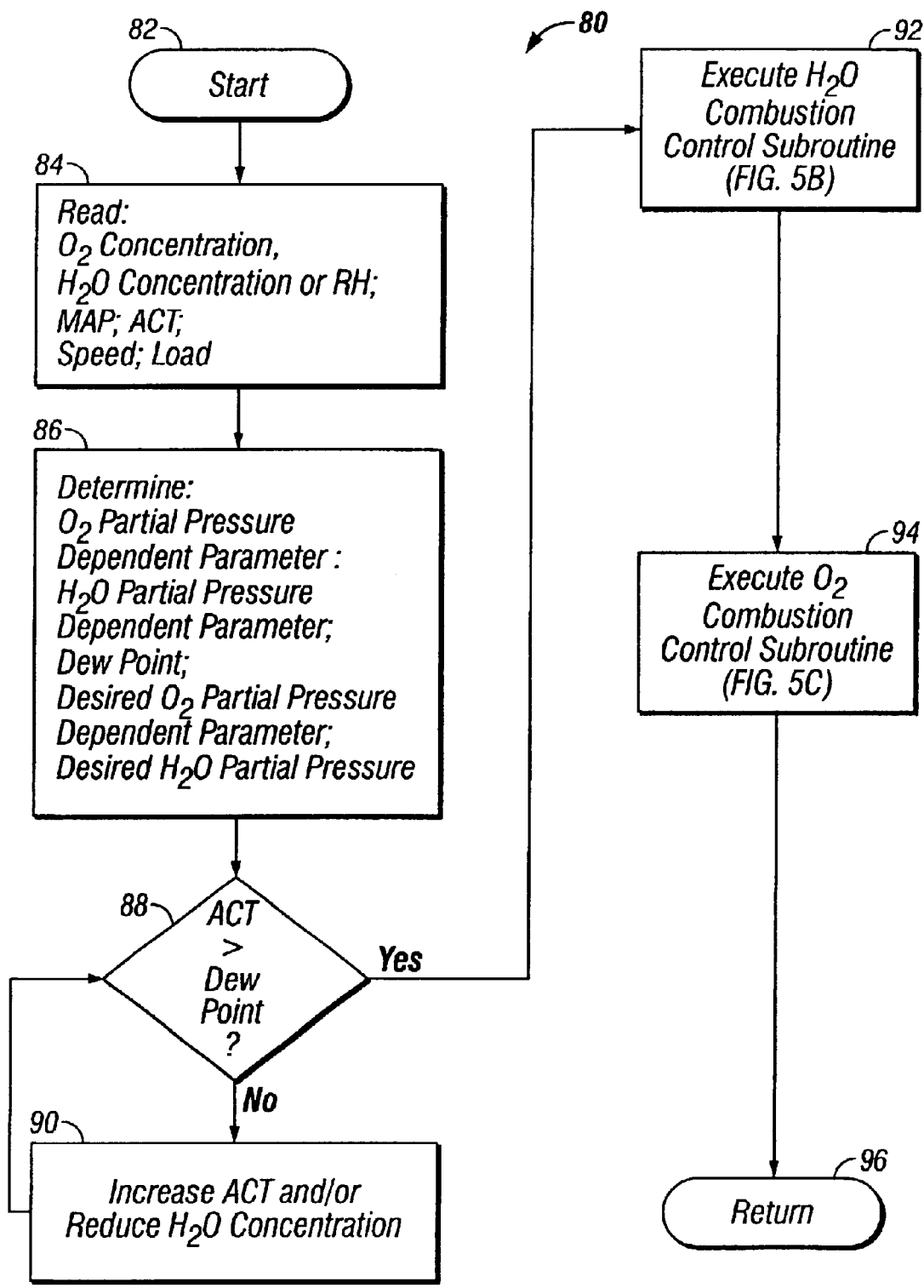
FIGS. 5A–5C are a series of flowcharts illustrating a preferred computer implemented technique for avoiding water vapor condensation and for optimizing engine combustion control based on a monitored intake mixture water vapor dependent parameter and/or a monitored intake mixture oxygen concentration dependent parameter.

Referring to FIG. 5A, the main routine 80 proceeds from START in Block 82 to a data acquisition Block 84, where the controller 62 reads MAP, ACT, $O_2$ concentration, relative humidity or another parameter indicative of $H_2O$ concentration, speed, and load from the sensors 64, 66, 68, and 70. The routine 80 then proceeds to Block 86, where the controller 62 determines an $O_2$ partial pressure dependent parameter and an $H_2O$ partial pressure dependent parameter that will serve as the basis for combustion control in the subroutines 100 and 120 of FIGS. 5B and 5C. The controller 62 also determines the dew point from the measured or determined relative humidity and the measured temperature in the intake passage 36.

Next, in Block 88, the routine 80 determines whether the mixture temperature is less than the dew point. The data for the mixture temperature may come from the sensor 68, the ACT sensor in the module 64 or, most preferably, may comprise the lower of the readings provided by the two sensors. If the answer to the inquiry is YES, the controller 62 takes active steps to increase ACT and/or reduce the $H_2O$ concentration sufficiently to prevent condensation in the intake system 24. For instance, it may adjust the EGR valve 56 setting to decrease the percentage of recirculated exhaust gases. The controller 62 could also simply close the EGR valve 56. The routine 80 then returns to Block 88 and repeats the operations of Blocks 88 and 90 until the temperature as measured by the sensor 64 and or the sensor 68 is less than the detected or determined dew point.

Figure 5B:
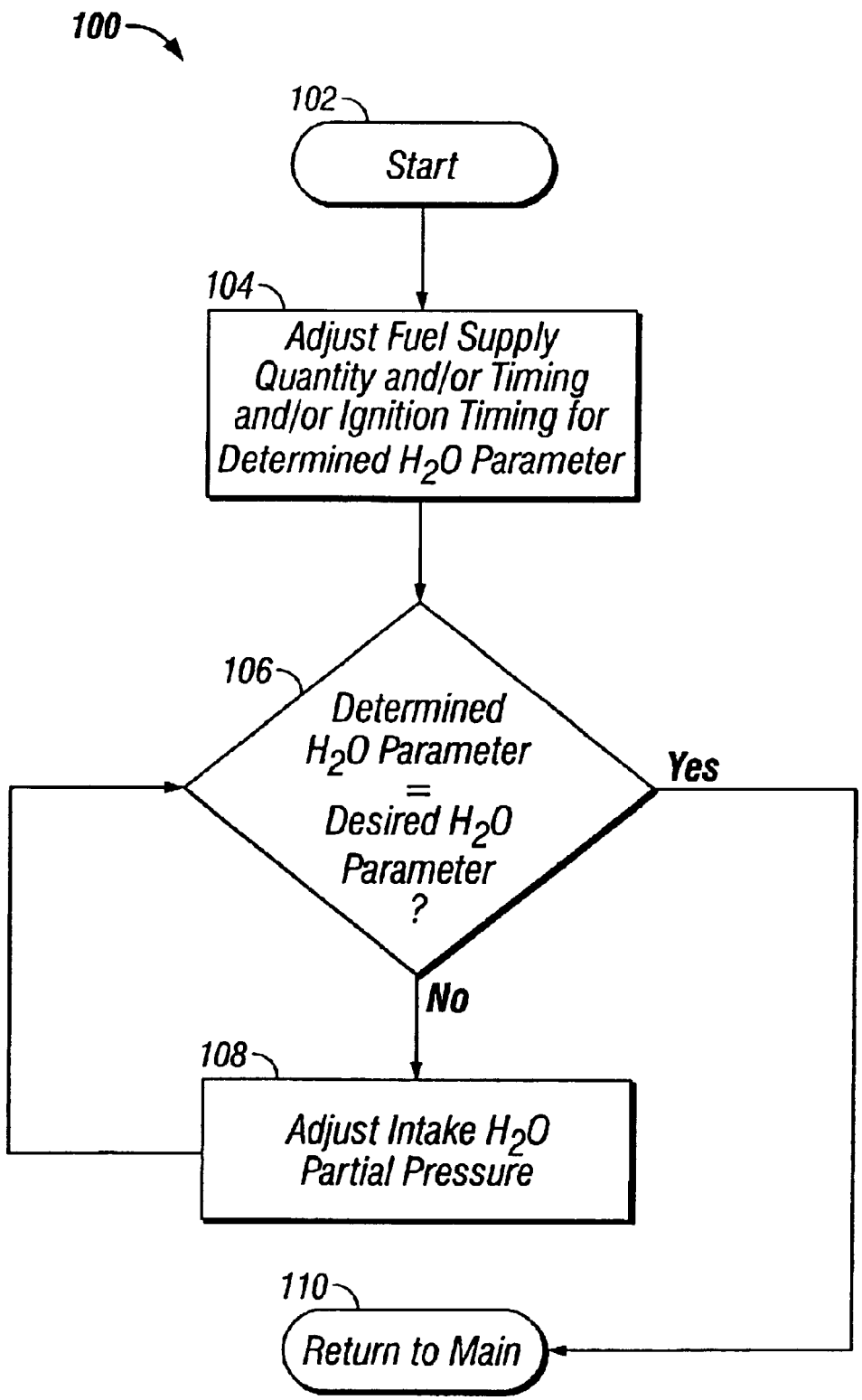

The routine 80 then proceeds to Block 92 to execute the $H_2O$ control subroutine 100 of FIG. 5B. Subroutine 100 proceeds from START in Block 102 to Block 104, where the subroutine 100 effects open-loop adjustment of one or more characteristics of the fuel and/or supply system air to take the beneficial reduction effects of the EGR water vapor in the exhaust stream into account. As indicated above, this control may be based on any parameter that is directly indicative of the water vapor content in the intake mixture. $H_2O$ partial pressure is preferred. The controller 62 preferably controls the engine 20 to make it run richer and increase ignition delay in the presence of higher $H_2O$ partial pressures. Hence, if a relatively low $H_2O$ partial pressure is detected, the controller 62 may control the fuel injectors to adjust diesel fuel injection quantity and/or control the TAB valve 50 to increase MAP in order to produce a leaner mixture. It may also retard the start of injection to compensate for a shortened ignition delay. Conversely, if the determined $H_2O$ partial pressure is relatively high, the controller 62 will typically control the fuel injectors to increase diesel fuel injection quantity and/or control the TAB valve 50 to reduce MAP to produce a richer mixture. It may also advance the start of fuel injection to compensate for an increased ignition delay. Some of these adjustments could be implemented by adjusting an existing lambda control procedure and/or by adjusting the EOR routine 120 described below to take the determined $H_2O$ partial pressure into account when selecting an optimal lambda or an optimal EOR. For instance, the target EOR as reflected by the inquiry Block 126 of the subroutine 120 of FIG. 5C may be revised downwardly at high $H_2O$ partial pressures. The controller 62 would then adjust the fuel and/or air supply and/or EGR devices to obtain the revised target EOR. The magnitude of target revision is engine specific. It preferably is selected from a map that correlates the magnitude of revision for a full range of $H_2O$ partial pressures against a full range of engine speed and load conditions for a particular engine operating parameter, such as $NO_x$ reduction. Similar strategies could be used to adjust a lambda optimization routine, a fuel injection timing optimization routine, etc.

If the engine 22 is capable of adjusting the $H_2O$ partial pressure in the intake system 24, the controller 62 can also effect closed loop optimization of $H_2O$ partial pressure or a parameter indicative of it to achieve a desired effect. For instance, if the EGR valve 56 is an actively controllable valve, it is possible to adjust the setting of the EGR valve 56 in a closed loop fashion to maintain the $H_2O$ partial pressure at a target or desired value that achieves a desired $NO_x$ emission level under prevailing speed, load, and fuel supply conditions. Hence, referring again to FIGS. 5 and 6, the routine 100 compares the determined $H_2O$ partial pressure or related parameter to the desired parameter in Block 106, and the controller 62 adjusts the EGR valve 56 to vary the $H_2O$ concentration in the intake mixture in Block 108. The subroutine 100 then returns to Block 106 and repeats Blocks 106 and 108 until the determined $H_2O$ parameter equals the desired $H_2O$ parameter. The subroutine 100 then returns to main in Block 110.

Referring again to FIG. 5A, the routine 80 proceeds to Block 94 to execute the subroutine 120 either in series with or parallel with execution of the subroutine of FIG. 5B. Execution of the subroutine 120 of FIG. 5C effects $O_2$ partial pressure based control using a strategy similar to that utilized to effect $H_2O$ partial pressure based control. Hence, the subroutine 120 proceeds from Start in Block 122 to Block 124, where it effects open-loop adjustment of combustion control based on a determined $O_2$ partial pressure dependent parameter. The $O_2$ partial pressure dependent parameter may be the $O_2$ partial pressure itself, the oxygen/fuel ratio, or, most preferably, the excess oxygen ratio (EOR). For instance, the controller 62 may control the fuel injectors to advance injection timing in the presence of a high EOR in order to compensate for the increased ignition delay resulting from the high EOR. Instead of or in addition to this open-ended control, the subroutine 120 may affect closed loop control of one or more engine operational characteristics to maintain an $O_2$ partial pressure dependent parameter at a desired value that optimizes a performance characteristic. Hence, in Block 126, the subroutine 120 first queries as to whether the determined $O_2$ parameter equals the desired parameter and, if not, proceeds to Block 128, where it adjusts engine operation to alter that parameter. In the preferred case in which the $O_2$ parameter is EOR, the same techniques that are used to adjust lambda may be used to adjust EOR. Indeed, at zero EGR, lambda equals EOR, and EOR control is identical to lambda control. One known lambda optimization technique, relying primarily on adjusting the setting of a TAB valve to adjust MAP or ACT to vary lambda, is described in detail in U.S. Pat. No. 6,273,076, the subject matter of which is hereby incorporated by reference. In addition to MAP adjustment, oxygen concentration, and therefore, EOR, can be adjusted even more directly by adjusting the setting of the EGR valve 56. EOR could also be adjusted by adjusting fuel injection quantity through control of the fuel injectors. The desired BOR value for any particular engine operating under a given set of speed and load conditions will depend upon the engine performance characteristic or characteristics sought to be optimized. Typically, and for the purposes of the present example, the desired EOR can be considered to be that which strikes the ideal balance between emissions and fuel economy at prevailing rpm, load, ACT, and skip fire conditions. This "ideal balance" may vary depending upon whether the designer is primarily concerned with maximizing fuel economy or with minimizing emissions. It may also take the $H_2O$ based optimization routine of FIG. SB into account.

The closed loop control of Blocks 126 and 128 is repeated until the subroutine 120 determines in Block 128 that the determined EOR or related parameter at least approximately equals the desired parameter, at which time the subroutine returns to the main routine in Block 130. The main routine 80 then proceeds to Return in Block 96, and the process is repeated.

B. Application to Gas Engine

The combustion control strategy described above is also applicable to either spark ignited natural gas engines or dual fuel or other compression ignited natural gas engines. One such engine 220 is illustrated schematically in FIG. 7. It contains most the same components as the corresponding diesel engine 20 of FIG. 6, with components of the engine 220 of FIG. 7 corresponding to components of the engine of FIG. 6 being incremented by 200. The engine 220 therefore includes:

a number of cylinders 222;

an intake system 224 including an air filter 234, an intake passage 236, an intake manifold 232, an air cooler 248, a TAB valve 250, and a venturi 260;

an exhaust system 226 including an exhaust manifold 238, a particulate trap 240, and an exhaust passage 242;

an EGR system 230 including an EGR passage 252, an EGR cooler 254, and an EGR valve 256;

a turbocharger including a compressor 244 and a turbine 246; and a controller 262 receiving signals from sensors 264, 266, and 270 and controlling all electronically controlled components of the engine 220.

The engine 220 of FIG. 7 differs from the engine 20 of FIG. 6 primarily in the following respects:

The diesel fuel supply system 228 of FIG. 6 is replaced with a fuel supply system that includes a gaseous fuel supply system and an ignition source for the gaseous fuel. The gaseous fuel supply system typically will consist of an LPG or CNG source and supply valves for selectively supplying natural gas to the individual cylinders 222 of the engine 220 from that source on demand. If the engine 220 is a spark-ignited engine, the ignition source 228 will include one or more spark plugs for each cylinder to gas. If the engine 220 is a dual fuel or other compression ignited gas engine, the ignition source will include diesel fuel injectors of the type commonly employed by such engines and a corresponding source of diesel fuel; and The particulate trap 240 is relocated at of the EGR passage inlet, and an oxidation catalyst 280 is placed in the exhaust outlet leading to the atmosphere. Oxidation catalyst 280 may be specially formulated for a lean-burn natural gas engine to reduce methane and non-methane hydrocarbons emissions.

Figure 5C:
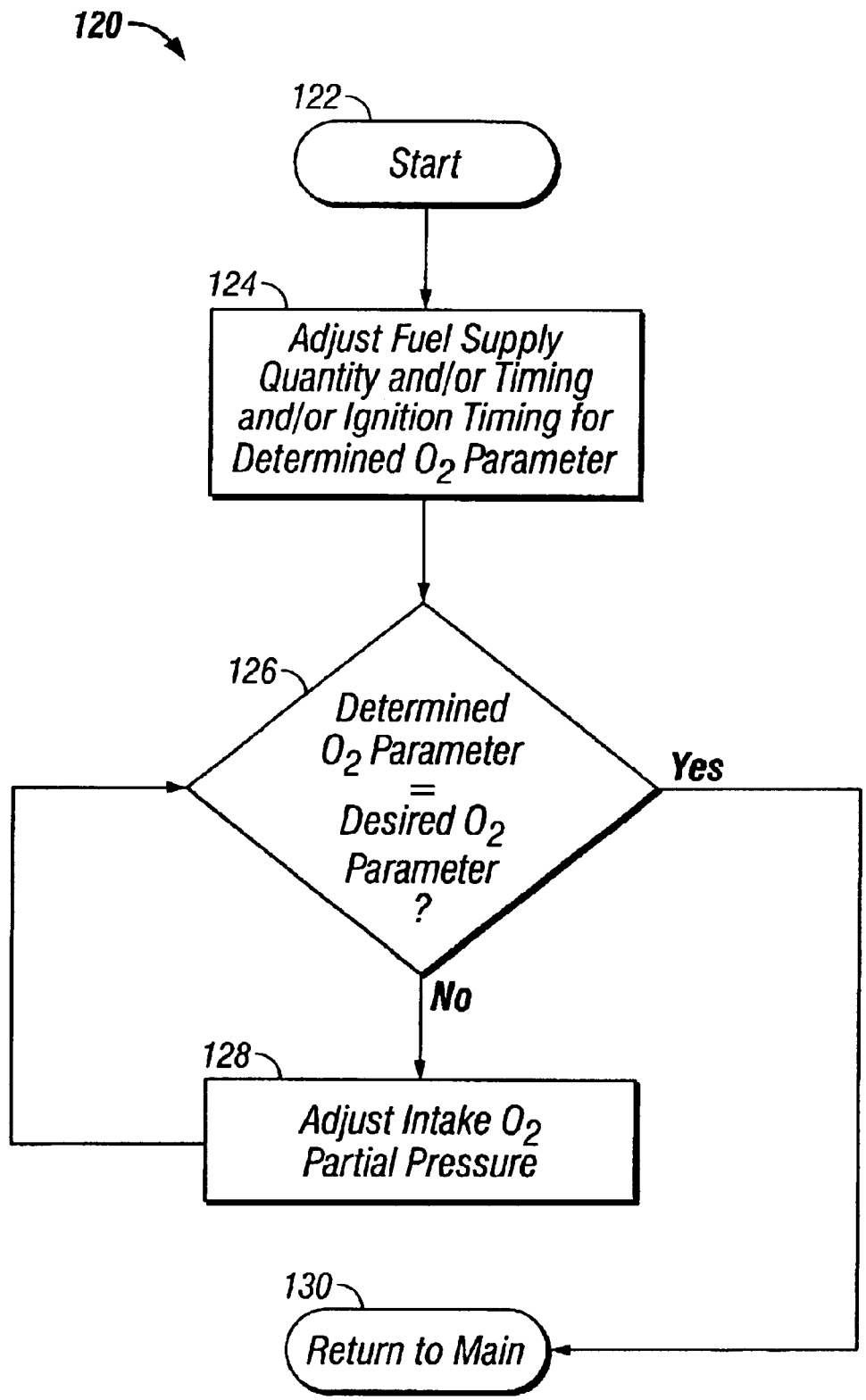
Figure 7:
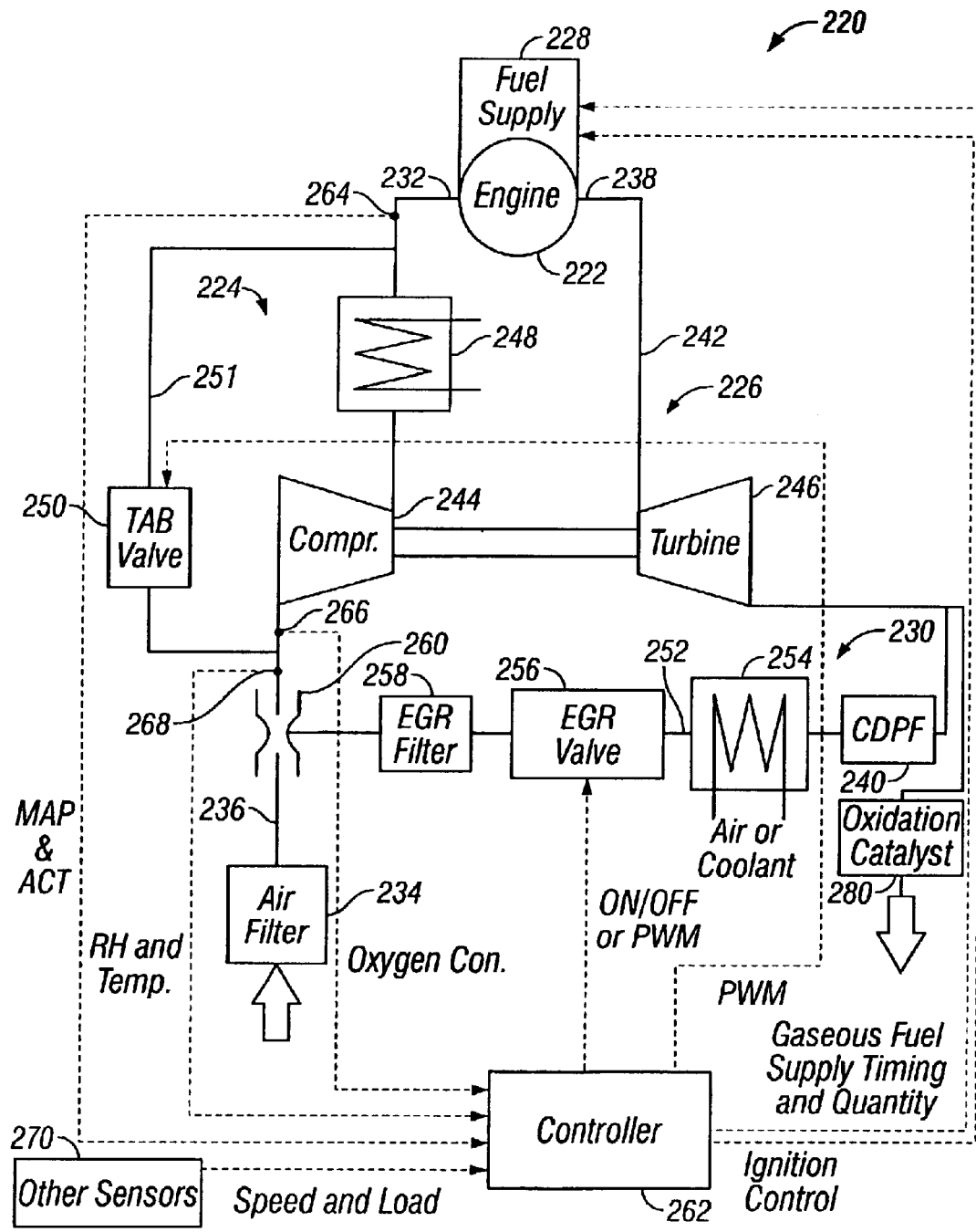
FIG. 7 schematically illustrates a spark ignition or compression ignition natural gas engine configured to be controlled by the combustion control routine shown in FIGS. 5A–5C.

The controller 262 engine of FIG. 7 controls operation of the various engine components using the same routine 80 illustrated in FIGS. 5A–5C. Referring again to FIGS. 5A–5C, the specific application of that routine to the engine of FIG. 7 differs from its application to the engine FIG. 6 only in that:

Gas fuel quantity rather than diesel fuel quantity are adjusted in Blocks 104 and 124.

In order to adjust ignition timing, pilot fuel injection timing or spark timing are adjusted in Blocks 104 and 124 rather than adjusting diesel fuel injection timing.

It can thus be seen that $O_2$ partial pressure and $H_2O$ partial pressure can be used to optimize combustion control of a variety of engines equipped with EGR. This control possibility considerably widens the range of applications for a relatively simple, inexpensive, reliable passive and uncontrolled and cooled EGR system while still meeting $NO_x$ and HC emission targets demanded by government regulations. It also can be used to prevent condensation in a variety of different EGR equipped engines in a manner that retains at least partial access to the benefits of EGR under most engine operating conditions. Also, as should be apparent from the above, the $O_2$ dependent control and $H_2O$ dependent control can be used either separately or together in a variety of different EGR equipped engines. To the extent that they might not be apparent from the above, the scope of variations falling within the scope of the present invention will become apparent from the appended claims.

We claim:

1. A method comprising:
(A) exhausting gases from an exhaust of an internal combustion engine that comprises one of a compression ignition engine and a spark ignited natural gas engine;
(B) mixing a portion of said exhaust gases (EGR) with air to form an intake mixture;
(C) directing said intake mixture into an intake of said engine;
(D) measuring a parameter indicative of the oxygen concentration of said intake mixture; and
(E) adjusting, based on the measuring step, at least one of a fuel supply timing, a fuel supply quantity, ignition timing, manifold absolute pressure (MAP), and air charge temperature (ACT).

2. The method as recited in claim 1, wherein the calculating step comprises calculating a parameter that depends on a partial pressure of oxygen in said intake mixture.

3. The method as recited in claim 2, further comprising comparing the oxygen partial pressure dependent parameter to a desired value of said oxygen partial pressure dependent parameter, and wherein the adjusting step is performed based on said comparison.

4. The method as recited in claim 3, wherein the adjusting step comprises adjusting at least one of a fuel supply timing, a fuel supply quantity, EGR flow, ignition timing, manifold absolute pressure (MAP), and air charge temperature (ACT).

5. The method as recited in claim 4, wherein said engine is a fuel-injected diesel engine and the adjusting step comprises adjusting at least one of diesel fuel injection timing, diesel fuel injection quantity, MAP, ACT, and EGR flow.

6. The method as recited in claim 4, wherein said engine is a spark-ignited natural gas engine, and wherein the adjusting step comprises adjusting at least one of spark timing, gaseous fuel supply timing, gaseous fuel supply quantity, MAP, ACT, and EGR flow.

7. The method as recited in claim 4, wherein said engine is a compression ignition natural gas engine, and wherein the adjusting step comprises adjusting at least one of pilot fuel injection timing, pilot fuel supply quantity, gaseous fuel supply timing, gaseous fuel supply quantity, MAP, ACT, and EGR flow.

8. The method as recited in claim 1, wherein the measuring step comprises measuring at least one parameter that is dependent on the concentration of moisture in said intake mixture.

9. The method as recited in claim 8, wherein the calculating step comprises determining a value of a parameter indicative of water vapor partial pressure in said intake mixture, and wherein the comparing step comprises comparing the calculated value of the parameter to a desired value of the same parameter, and wherein the adjusting step is performed based on said comparison.

10. The method as recited in claim 9, wherein the adjusting step comprises adjusting at least one of ignition timing, fuel supply quantity, and EGR flow.

11. The method as recited in claim 8, wherein the measured parameter is indicative of one of 1) ambient relative humidity and 2) the relative humidity of said intake mixture, and further comprising adjusting engine operation so as to avoid condensation in an intake system that directs said intake mixture to said intake system.

12. The method as recited in claim 11, wherein the adjusting step comprises adjusting at least one of 1) a temperature of said intake mixture and 2) the moisture concentration of said intake mixture.

13. The method as recited in claim 12, wherein the adjusting step comprises adjusting the setting of an exhaust gas recirculation valve controlling EGR flow to said intake system of said engine.

14. The method as recited in claim 12, wherein said engine is a turbocharged engine having a compressor that compresses at least a portion of said intake mixture before said intake mixture is inducted into said intake, a turbine through which exhaust gases flow, and a turbo air bypass valve that can be selectively controlled to permit a portion of said intake mixture to bypass said compressor, and wherein the adjusting step comprises actively adjusting the setting of at least one of said turbo air bypass valve and said exhaust gas recirculation valve.

15. The method as recited in claim 1, further comprising measuring a parameter indicative of the moisture concentration of said intake mixture and adjusting, based on the moisture-concentration indicative parameter measurement, at least one of a fuel supply quantity, ignition timing, MAP, ACT, and EGR flow.

16. A method comprising:
(A) exhausting gases from an exhaust of an internal combustion engine;
(B) mixing a portion of the exhaust gases (EGR) with air to form an intake mixture;

(C) directing said intake mixture into an intake of said engine;

(D) measuring a parameter of a constituent of said intake mixture;

(E) calculating, based on said measuring step, a parameter indicative of a partial pressure of said constituent in said intake mixture;

(F) comprising comparing the oxygen partial pressure dependent parameter to a desired value of said oxygen partial pressure dependent parameter, and (F) adjusting, based on said comparison, an engine operating characteristic, wherein the calculating step comprises calculating a parameter that depends on a partial pressure of oxygen in said intake mixture, wherein the oxygen partial pressure dependent parameter is an excess oxygen ratio (EOR) of a charge formed from said intake mixture and fuel, the comparing step comprises comparing a determined EOR to a desired EOR, and wherein the adjusting step comprises adjusting operation of said engine based on said comparison.

17. A method comprising:

(A) exhausting gases from an exhaust of an internal combustion engine;

(B) mixing a portion of the exhaust gases (EGR) with air to form an intake mixture;

(C) directing said intake mixture into an intake of said engine;

(D) measuring a parameter of a constituent of said intake mixture;

(E) calculating, based on said measuring step, a parameter indicative of a partial pressure of said constituent in said intake mixture; and (F) adjusting an engine operating characteristic based on the calculating step, wherein said engine is equipped with a passive EGR system which recalculates exhaust gasses from an exhaust system of an engine to an intake system of said engine but which lacks an actively settable exhaust gas recirculation valve.

18. A method comprising:

(A) exhausting gases from an exhaust of an internal combustion engine;

(B) mixing a portion of said exhaust gases (EGR) with air in an intake system of said engine to form an intake mixture;

(C) directing said intake mixture into an intake of said engine via said intake system;

(D) measuring a parameter indicative of the moisture concentration of said intake mixture; and (E) adjusting, based on the measuring step, at least one of a fuel supply timing, a fuel supply quantity, ignition timing, manifold absolute temperature (MAP), and air charge temperature (ACT).

19. The method as recited in claim 18, further comprising measuring a parameter indicative of the oxygen concentration of said intake mixture and adjusting, based on the oxygen-content indicative parameter measurement, at least one of fuel supply timing, fuel supply quantity, ignition timing, MAP, and ACT.

20. The method as recited in claim 18, wherein said parameter is one indicative of relative humidity of said mixture, and further comprising controlling operation of said engine, based at least in part on the measuring step, to avoid condensation in said intake system of said engine.

21. A method comprising:

(A) exhausting gases from an exhaust of an internal combustion engine;

(B) mixing a portion of said exhaust gases (EGR) with air in an intake system of said engine to form an intake mixture;

(C) directing said intake mixture into an intake of said engine via said air intake system;

(D) measuring a parameter indicative of the moisture concentration of said mixture;

(E) measuring a parameter indicative of the oxygen concentration of said mixture; and (F) adjusting, based on both of the measuring steps, at least one of a fuel supply timing, a fuel supply quantity, ignition timing, manifold absolute pressure (MAP), and air charge temperature (ACT).

22. The method as recited in claim 21, further comprising 1) determining, based on the measuring steps, a partial pressure of oxygen in said mixture and a partial pressure of water vapor in said mixture, and 2) comparing parameters indicative of the determined partial pressures to corresponding desired parameters, and wherein the adjusting step is performed based on said comparisons.

23. The method as recited in claim 22, further comprising determining, using the determined partial pressure of oxygen in said mixture, an excess oxygen ratio (EOR) of charge formed from said intake mixture and fuel, and wherein the comparing step comprises comparing the determined EOR to a desired EOR.

24. The method as recited in claim 21, wherein the moisture concentration indicative parameter is one indicative of the relative humidity of said mixture, and further comprising controlling operation of said engine, based at least in part on the measuring step, to avoid condensation in said intake system of said engine.

25. An engine comprising:

(A) at least one cylinder in which combustion takes place by one of compression ignition and spark ignition of natural gas;

(B) a fuel supply device communicating with said cylinder;

(C) an exhaust passage conveying exhaust gasses from said cylinder;

(D) an intake system including
 (1) an air intake passage in communication with said cylinder, and
 (2) an EGR line having an inlet connected to said exhaust passage and an outlet connected to said air intake passage;

(E) a sensor arrangement including at least one of an oxygen sensor that is configured to measure a parameter indicative of the oxygen concentration of a mixture of air and EGR in said air intake system and a moisture sensor that is configured to measure a parameter indicative of the moisture concentration of the mixture; and (F) a controller that is connected to said sensor arrangement and that is operable to:
 (1) calculate, based on signals received from said sensor arrangement, at least one of a parameter indicative of the partial pressure of oxygen in the mixture and a parameter indicative of the partial pressure of water vapor in the mixture; and
 (2) adjust at least one engine operating characteristic based on the calculation, the engine operating characteristic including at least one of a fuel supply timing, a fuel supply quantity, ignition timing, manifold absolute pressure (MAP), and air charge temperature (ACT).

26. The engine as recited in claim 25, wherein said controller is configured to adjust at least one of ignition timing and a fuel supply quantity based on the calculation.

27. The engine as recited in claim 26, wherein said engine is a diesel engine and the controller is configured to adjust at least one of diesel fuel injection timing and diesel fuel injection quantity.

28. The engine as recited in claim 26, wherein said engine is a spark-ignition natural gas engine, and wherein said controller is configured to adjust at least one of spark timing, gaseous fuel supply timing, and gaseous fuel supply quantity.

29. The engine as recited in claim 26, wherein said engine is a compression ignition, natural gas engine, and wherein said controller is configured to adjust at least one of a pilot fuel injection timing, pilot fuel injection quantity, gaseous fuel supply timing, and gaseous fuel supply quantity.

30. The engine as recited in claim 25, wherein said controller is configured to adjust at least one of air charge temperature (ACT), manifold absolute pressure (MAP), and EGR flow based on the calculation.

31. The engine as recited in claim 25, wherein
said sensor arrangement includes an oxygen sensor,
the determined parameter includes an excess oxygen ratio (EOR) of an charge formed by the mixture and fuel, and
said controller is configured to compare the determined EOR to a desired EOR and to adjust engine operation based on the comparison.

32. The engine as recited in claim 25, wherein the calculated parameter includes a value indicative of water vapor partial pressure of the mixture and said controller is configured to compare the calculated value of the parameter to a desired value of the parameter and to adjust engine operation based on the comparison.

33. The engine as recited in claim 25, wherein the sensor arrangement is configured to measure a parameter indicative of at least one of 1) ambient relative humidity and 2) the relative humidity of the mixture, and wherein said controller is configured to adjust engine operation so as to avoid condensation in said air intake system.

34. The engine as recited in claim 32, wherein said controller is configured to adjust at least one of 1) the temperature of the mixture and 2) the moisture concentration of the mixture.

35. The engine as recited in claim 34, further comprising an actively settable EGR valve located in said EGR line.

36. The engine as recited in claim 25, wherein said engine is equipped with a passive EGR system lacking an actively settable exhaust gas recirculation valve.

37. An engine comprising:
(A) means for mixing a portion of gases exhausted from said engine with air to form a mixture;
(B) means for directing said mixture into an intake of said engine;
(C) means for measuring at least one of
  (1) a parameter indicative of the oxygen concentration in said mixture, and
  (2) a parameter indicative of the moisture concentration in said mixture;
(D) means, responsive to said means for said means for measuring, for calculating a parameter indicative of at least one of
  (1) a parameter dependent upon a partial pressure of oxygen in said mixture, and
  (2) a parameter dependent upon a partial pressure of water vapor in said mixture; and
(E) means, responsive to said means for calculating, for adjusting at least one of a fuel supply timing, a fuel supply quantity, ignition timing, manifold absolute pressure (MAP), and air charge temperature (ACT).

38. The engine as recited in claim 37, wherein said means for adjusting adjusts at least one of a fuel supply quantity, a fuel supply timing, manifold absolute pressure (MAP), ignition timing, and air charge temperature (ACT).

39. A method comprising:
(A) exhausting gases from an exhaust of an internal combustion engine that comprises one of a compression ignition engine and a spark ignited natural gas engine;
(B) mixing a portion of the exhaust gases (EGR) with air to form an intake mixture;
(C) directing said intake mixture into an intake of said engine;
(D) measuring a parameter of a constituent of said intake mixture;
(E) calculating, based on said measuring step, a parameter indicative of a partial pressure of said constituent in said intake mixture; and
(F) based on the calculating step, adjusting an engine operating parameter without actively regulating EGR rate.

* * * * *